(12) United States Patent
Sparkman et al.

(10) Patent No.: US 8,037,905 B2
(45) Date of Patent: Oct. 18, 2011

(54) GAS FILL PROCESS AND INFLATOR WELD DESIGN SIMPLIFICATION

(75) Inventors: John P. Sparkman, Dayton, OH (US); Charles M. Woods, W. Manchester, OH (US); William H. Phipps, St. Paris, OH (US)

(73) Assignee: Autoliv Development AB, Vargarda (SE)

( * ) Notice: Subject to any disclaimer, the term of this patent is extended or adjusted under 35 U.S.C. 154(b) by 797 days.

(21) Appl. No.: 12/131,547

(22) Filed: Jun. 2, 2008

(65) Prior Publication Data

US 2009/0295133 A1   Dec. 3, 2009

(51) Int. Cl.
*B21F 27/04* (2006.01)
*B60R 21/28* (2006.01)

(52) U.S. Cl. .................. 141/4; 141/9; 141/52; 280/741
(58) Field of Classification Search .................. 141/3, 4, 141/9, 20, 44, 47, 52, 54, 103; 280/741
See application file for complete search history.

(56) References Cited

U.S. PATENT DOCUMENTS

| | | | | |
|---|---|---|---|---|
| 5,897,137 | A * | 4/1999 | Al-Amin et al. | 280/741 |
| 6,120,058 | A * | 9/2000 | Mangum et al. | 280/741 |
| 7,159,622 | B1 * | 1/2007 | Fink | 141/54 |
| 2003/0042719 | A1 * | 3/2003 | Rink et al. | 280/736 |
| 2004/0262901 | A1 * | 12/2004 | Brewster et al. | 280/741 |
| 2007/0246121 | A1 * | 10/2007 | Michel et al. | 141/4 |

* cited by examiner

*Primary Examiner* — Dinh Nguyen
*Assistant Examiner* — Jennifer Gordon
(74) *Attorney, Agent, or Firm* — Harness, Dickey & Pierce, P.L.C.

(57) ABSTRACT

A method is provided for filling an enclosure with an ignitable mixture of gases. The enclosure has an outer wall comprising an exterior surface, an interior surface, and a fill aperture extending therethrough. The method comprises delivering a predetermined amount of pressurized combustible gas into the enclosure through the fill aperture, delivering a first predetermined amount of pressurized inert gas into the enclosure through the fill aperture at a first pressurization rate, delivering a second predetermined amount of pressurized inert gas into the enclosure through the fill aperture at a second pressurization rate, welding a sealing member to the outer wall of the enclosure by a welding process to form a weld operable to seal the fill aperture and to permit the enclosure to store pressurized gas therein. The first pressurization rate allows the first predetermined amount of pressurized inert gas to mix with the predetermined amount of pressurized combustible gas to form an ignitable mixture. The second pressurization rate is lower than the first pressurization rate. The second pressurization rate allows stratification to form within the enclosure between a layer of the ignitable mixture and a layer of the second predetermined amount of pressurized inert gas. The layer of the second predetermined amount of pressurized inert gas is disposed between the layer of the ignitable mixture and the fill aperture.

14 Claims, 5 Drawing Sheets

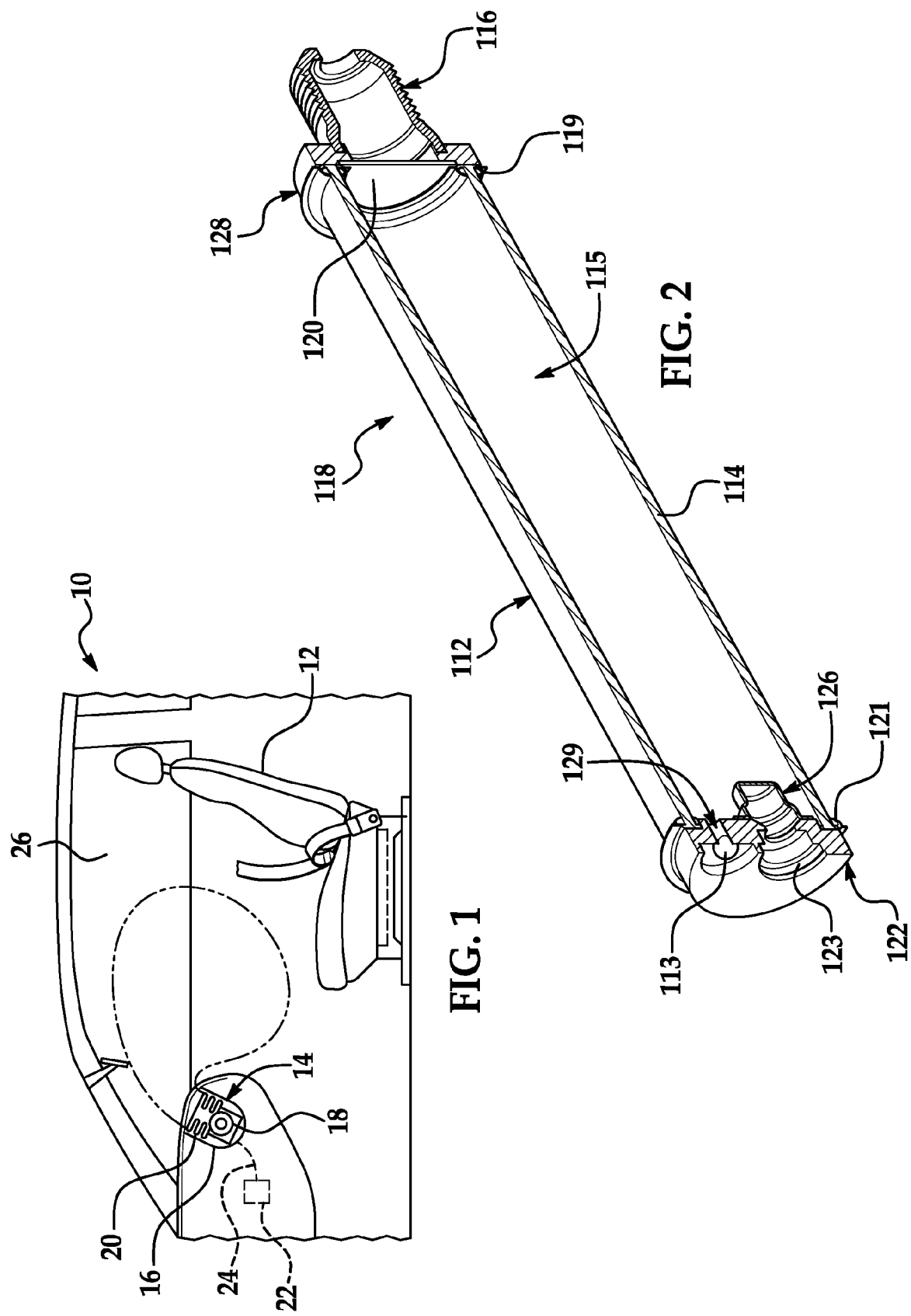

GAS FILL PROCESS AND INFLATOR WELD DESIGN SIMPLIFICATION

BACKGROUND

Exemplary embodiments of the present invention relate to pressurized-gas containers, and, more specifically, exemplary embodiments of the present invention relate to filling pressurized-gas containers with gas.

Air bag modules or inflatable cushions have become common in modern automobiles for protecting vehicle occupants during collisions. An air bag module typically comprises at least an inflatable cushion and an inflator housing a highly pressurized gas for inflating the cushion. When a vehicle undergoes a collision, a sensor detects the rapid change in motion and provides an electrical signal to activate or ignite an inflator. When ignited, the inflator releases the stored pressurized gas into the cushion, which expands from a folded position to deploy into the vehicle.

One particular type of inflator is a heated gas inflator, in which an ignitable mixture of gases is stored under pressure. The ignitable mixture of gases in such an inflator generally includes hydrogen and/or a hydrogen-hydrocarbon mixture (for example, a hydrogen-propane mixture), and an inert gas or premixed inert gas mixture. A heated gas inflator includes a gas storage chamber or an enclosure for holding the ignitable gas mixture under pressure. An inflator will generally also include an initiator or squib separated from an interior of the inflator by a membrane or a burst disk that the initiator or squib ruptures upon activation to be in fluid communication with the ignitable gas mixture. During operation, the ignitable gas is ignited by the initiator or squib to heat the inert gas or gas mixture, thereby providing an expanding gas and increasing the pressure within the enclosure. The increased pressure causes the burst disk to rupture, thereby enabling the pressurized gases to exit from the inflator output and ultimately inflate the inflatable cushion.

During manufacture of the inflator, the gases are provided to the enclosure under pressure through a small "fill aperture" in an end of the enclosure. After the gases have been placed within the enclosure, a welding process is used to permanently seal the fill aperture. Due to the ignitable nature of the gases used, however, the current fill process requires that the fill aperture first be temporarily sealed to prevent the ignitable gas mixture from escaping from the enclosure and inadvertently igniting as a result of heat generated by the welding process that is used to provide a more permanent closure of the fill aperture.

To provide for both the temporary seal and the more permanent closure weld to be performed, the fill aperture is constructed to have a multi-surface machined interface. In a typical instance, the fill aperture is be formed with multiple stepped aperture portions including a narrower first aperture portion defined by an inner side-wall surface for allowing the sealing member to be inserted and guided therein to form the temporary seal, a second aperture portion defined by an inner-side wall surface and a step surface for distancing the temporary seal from the closure weld, and a wider third aperture portion defined by an inner-side wall surface and a step surface for defining an edge to allow a clean welding location for the closure weld.

The multi-surface machined interface of the fill aperture, in turn, requires that the sealing member be formed as a multi-machined member with a sealing portion for forming the temporary seal and a head portion for forming the closure weld. It should be appreciated that the manufacture of corresponding multi-machined sealing members and fill apertures is complex and expensive, and the aforementioned process of sealing an inflator is also complex. In addition to this complexity, numerous other drawbacks exist in the current inflator manufacture process. For example, the sealing portion of a sealing member may shift out of position within the fill aperture or may not always properly align within the fill aperture, which can result in combustible gas leaking from the inflator and being inadvertently ignited.

Accordingly, it is desirable to provide for the manufacture of pressurized inflators in a more easy, effective, and efficient manner.

SUMMARY

Exemplary embodiments of the present invention are related to a method for filling an enclosure with an ignitable mixture of gases. The enclosure has an outer wall comprising an exterior surface, an interior surface, and a fill aperture extending therethrough. The method comprises delivering a predetermined amount of pressurized combustible gas into the enclosure through the fill aperture, delivering a first predetermined amount of pressurized inert gas into the enclosure through the fill aperture at a first pressurization rate, delivering a second predetermined amount of pressurized inert gas into the enclosure through the fill aperture at a second pressurization rate, welding a sealing member to the outer wall of the enclosure by a welding process to form a weld operable to seal the fill aperture and to permit the enclosure to store pressurized gas therein. The first pressurization rate allows the first predetermined amount of pressurized inert gas to mix with the predetermined amount of pressurized combustible gas to form an ignitable mixture. The second pressurization rate is lower than the first pressurization rate. The second pressurization rate allows stratification to form within the enclosure between a layer of the ignitable mixture and a layer of the second predetermined amount of pressurized inert gas. The layer of the second predetermined amount of pressurized inert gas is disposed between the layer of the ignitable mixture and the fill aperture.

Exemplary embodiments of the present invention are also related to a system for filling an enclosure with an ignitable mixture of gases. The enclosure has an outer wall with an exterior surface, an interior surface, and a fill aperture extending therethrough. The system comprises a container having an interior configured to receive and supportively retain the enclosure therein, a pressurized gas source configured to deliver pressurized gas to the enclosure through an airtight conduit having a valve mechanism disposed therein, a linear actuator disposed within the interior of the container and operably connected to an electrode, a welding current source configured to route a welding current through the electrode to a sealing member disposed adjacent to the electrode within an interior of the conduit, and a control unit operably coupled to the pressurized gas source, the valve mechanism, the linear actuator, and the welding current source. The conduit extends from the valve mechanism through the interior of the container to the exterior surface of the outer wall of the enclosure about the fill aperture when the enclosure is retained within the container to provide fluid communication with the enclosure through the fill aperture. The valve mechanism is configured to selectively permit or prevent delivery of pressurized gas from the pressurized gas source to the enclosure through the conduit such that the pressurized gas can enter the fill aperture of the enclosure when the enclosure is retained within the container. The electrode extends from the linear actuator into an interior of the conduit toward the inflator through a cavity formed in the conduit. The control unit is configured to direct operation of the valve mechanism and the pressurized gas source to deliver a predetermined amount of combustible gas into the enclosure through the fill aperture, to deliver a first predetermined amount of pressurized inert gas into the enclosure through the fill aperture at a first pressurization rate, and to deliver a second predetermined amount of pressurized inert gas into the enclosure through the fill aperture at a second pressurization rate. The first pressurization rate allows the predetermined amount of the pressurized combustible gas to mix with the first predetermined amount of pressurized inert gas to form an ignitable mixture. The second pressurization rate allows stratification to form within the enclosure between a layer of the ignitable mixture and a layer of the second predetermined amount of pressurized inert gas. The layer of the second predetermined amount of pressurized inert gas is disposed between the layer of the ignitable mixture and the fill aperture. The control unit is further configured to direct the linear actuator to move the electrode in a first direction to move the sealing member into contact with the outer wall of the enclosure about the fill aperture when the enclosure is retained within the container and to activate the welding current source to route the welding current to form a weld between the outer wall and the sealing member operable to seal the fill aperture and to permit the enclosure to store pressurized gas therein.

The above-described and other features of the present disclosure will be appreciated and understood by those skilled in the art from the following detailed description, drawings, and appended claims.

BRIEF DESCRIPTION OF THE DRAWINGS

FIG. 1 is a cross-sectional view of a portion of a vehicle having an air bag module;

FIG. 2 is a cross-sectional view of an inflator constructed in accordance with an exemplary embodiment of the present invention;

DESCRIPTION OF EXEMPLARY EMBODIMENTS

Figure 3:
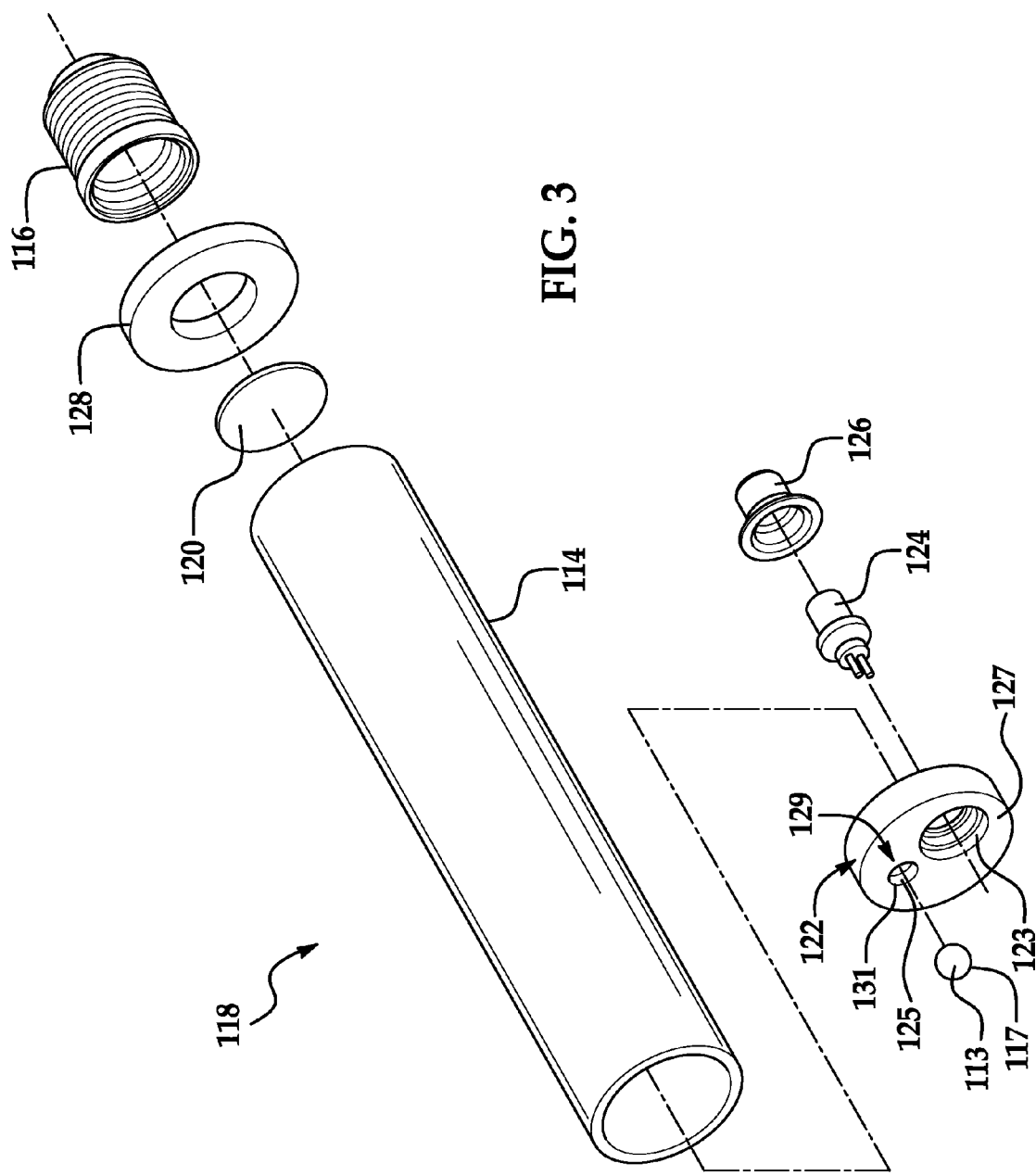
FIG. 3 is an exploded view of the exemplary inflator of FIG. 2.

Referring now to FIG. 1, an exemplary embodiment of a portion of a vehicle 10 having an inflatable safety device is illustrated. Included in an interior compartment of vehicle 10 is a seating structure 12 and an air bag module 14 disposed in a selected spatial relationship with respect to the seating structure. Air bag module 14 comprises a housing 16, an inflator 18, and an inflatable cushion 20. Module 14 is positioned in vehicle 10 for deployment of cushion 20 away from housing 16 (that is, rearward in the present exemplary embodiment). Inflator 18 can be a single stage inflator capable of releasing a single quantity of inflation gas into cushion 20. Alternately, inflator 18 can be a dual stage inflator, adapted to release at least two levels of inflation gas into cushion 20. Inflator 18 is a combustible gas inflator that ignites combustible gases that react with inert or non-combustible gases to provide an inflator output. In particular, a combustible gas inflator utilizes a combustible gas (that is, a gas that chemically reacts exothermically with oxygen such as, for example, hydrogen or a hydrogen-hydrocarbon mixture) and an inert gas or gas mixture (for example, oxygen, argon, and/or helium) to provide an inflator output.

Vehicle 10 further includes a sensor or sensing-and-diagnostic module 22 adapted to provide an activation signal 24 to inflator 18 upon detecting an activation event. The detection of the activation event can be determined by one or more sensors disposed about the vehicle. Thus, module 22 operates to control the activation of air bag module 14 via activation signal 24.

Inflatable cushion 20 is stored in a folded or undeployed position in housing 16, and is in fluid communication with inflator 18. Upon detection of an activation event by sensing-and-diagnostic module 22, inflator 18 is activated via signal 24 to generate an inflation gas. The inflation gas causes cushion 20 to inflate and expand from housing 16 into an interior compartment 26 of vehicle 10 (as illustrated in phantom lines in FIG. 1).

Referring now to FIG. 2, an inflator 118 that has been filled with an ignitable mixture of gases in accordance with an exemplary embodiment of the present invention is illustrated. FIG. 3 illustrates an exploded view of inflator 118. In the present exemplary embodiment, inflator 118 is a heated gas inflator. The ignitable mixture of gases is stored under pressure in an interior chamber 115 within inflator 118. In alternative exemplary embodiments, the inflator may be any type of inflator that includes a mixture of gases stored under pressure.

As depicted in FIG. 2, Inflator 118 includes a cylindrical metal enclosure 112 that defines interior chamber 115 for storing a combustible gas and an inert gas or premixed inert gas mixture that interacts with the combustible gas to provide inflator output. In particular, inflator 118 stores a pressurized mixture of a combustible gas (for example, hydrogen or a hydrogen-hydrocarbon mixture such as a hydrogen-propane mixture) and an inert gas or gas mixture (for example, oxygen, argon, and/or helium) by utilizing a sealing member 113 for sealing or closing a "fill aperture" 129 in enclosure 112 after the enclosure has been filled with both the combustible gas and the inert gas or inert gas mixture through the fill aperture. It should be noted that the location of fill aperture 129 may vary in exemplary embodiments and is not critical. The inflator output can provides for inflation of an inflatable cushion that is in fluid communication with inflator 118. In the present exemplary embodiment, enclosure 112 is depicted as having a cylindrical cross-sectional shape along its length. Nevertheless, it should be noted that the cross-sectional shape shown for enclosure 112 should be considered non-limiting, and it is also contemplated that, in other exemplary embodiments, the inflator may have a cross-sectional shape other than cylindrical such as, for example, toroidal, flat or pancake-style, rectangular, square, oval, or another appropriate shape. In an exemplary embodiment, enclosure 112 can be configured to retain at least 90 percent of the inflator output for at least 15 years, which could be verified using, for example, an inflator tank test.

Enclosure 112 includes a tubular or hollow cylindrical housing portion 114, a nozzle portion 116, a nozzle endcap 128, a burst disk 120, an electrically conductive, initiation endcap 122, an initiator 124, and an initiator sleeve 126. Housing portion 114 is provided to retain a combustible gas and an additional inert gas therein when enclosed by endcap 122 and burst disk 120. In particular, housing portion 114 is enclosed at a first end 119 by a nozzle endcap 128 and at a second end 121 by initiation endcap 122. In exemplary embodiments, housing portion 114 can be constructed from a steel or a metal alloy and endcaps 128, 122 can be resistance welded to first and second ends 119, 121 respectively of the housing portion.

Nozzle portion 116 is provided to direct the inflating gas from enclosure 112 into, for example, an inflatable cushion. Nozzle portion 116 is operably coupled to nozzle endcap 128. In exemplary embodiments, nozzle portion 116 can be constructed from a steel or a metal alloy and resistance welded to endcap 128. Burst disk 120 is provided to enclose first end 119 of housing portion 114. As illustrated in FIG. 2, burst disk 120 is operably coupled between first end 119 and endcap 128. Burst disk 120 is configured to break, bust, or fracture when a pressure inside enclosure 112 is larger than a predetermined pressure. When burst disk 120 breaks, the interior volume of enclosure 112 is in fluid communication with nozzle portion 116 to allow the expanding inflation gas to exit through the nozzle portion and fill, for example, an inflatable cushion. Nozzle endcap 128 is welded to first end 119 of housing portion 114 and fixedly holds burst disk 120 against the first end.

Initiator 124 is provided to ignite an ignitable gas mixture stored in enclosure 112 in response to, for example, an electrical control signal provided by a sensor module. Initiator 124 can comprise a pyrotechnic device or any other suitable type of ignition device for igniting the ignitable gas mixture stored in enclosure 112. Initiator 124 is disposed in initiator sleeve 126, which is further disposed in an aperture 123 that extends through endcap 122. Initiator sleeve 126 is provided to hold initiator 124 within endcap 122 such that a portion of initiator 124 is in fluid communication with the gas stored in an interior of enclosure 112. Sleeve 126 is fixedly welded to endcap 122 and extends through aperture 123 in the endcap. Endcap 122 is provided to enclose second end 121 of housing portion 114 and, in exemplary embodiments, can be constructed from a steel, a metal alloy, or other electrically conductive materials. Endcap 122 can be welded to enclosure 112

In the present exemplary embodiment, endcap 122 includes fill aperture 129 extending therethrough. Fill aperture 129 is of a generally cylindrical shape defined by an electrically conductive inner side-wall surface 125 and is utilized for allowing a combustible gas and an inert gas or inert gas mixture to be initially placed in enclosure 112. After enclosure 112 has been filled with combustible gas and inert gases to a predetermined pressure level, sealing member 113 can be welded to endcap 122 to seal or close fill aperture 129 in endcap 122.

Figure 4:
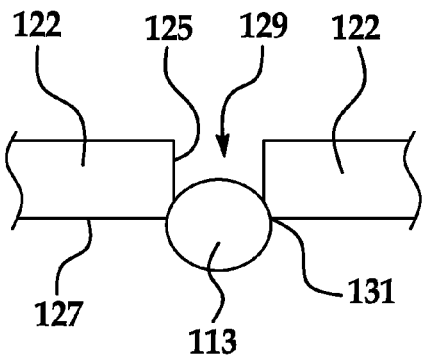
FIG. 4 is a partial, cross-sectional view of a seal formed on the exemplary inflator of FIG. 2 in accordance with another exemplary embodiment of the present invention.

As best shown in FIG. 4, sealing member 113 is formed as a metal spherical welding ball that is resistance welded to endcap 122 to seal fill aperture 129 such that enclosure 112 can store a pressurized gas mixture therein. In exemplary embodiments, sealing member 113 can be constructed from steel or another electrically conductive metal or metal alloy that will allow the sealing member to be weldably sealed to endcap 122. It should of course be noted that fill aperture 129 may be closed or plugged in some other fashion that allows enclosure 112 to be filled with a pressurized gas mixture and sealed. As will be described with relation to exemplary embodiments below, when sealing member 113 is resistance welded to endcap 122, it is not necessary to have a temporary seal present in fill aperture 129 to protect the ignitable gas mixture in inflator 129 from inadvertent ignition as a result of the heat affected area around sealing member 113 created during the welding operation. As a result, it is not necessary to provide fill aperture 129 with a multi-machined interface or sealing member as a multi-machined member having a portion constructed from an electrically non-conductive material to enable such a temporary seal.

In the present exemplary embodiment, when sealing member 113 is welded to endcap 122, the region of contact between the sealing member and the endcap is at the circular edge 131 formed between inner side-wall surface 125 and an outer surface 127 of the endcap. Circular edge 131 provides a sharp interface for welding sealing member 113 to endcap 122. Circular edge 131 has a diameter that is smaller than the diameter of sealing member 113 such that the sealing member can weldably seal fill aperture 129. For example, the diameter of sealing member 113 can be 0.25 mm larger than the diameter of fill aperture 129. Of course, it should be noted that the difference between the diameter of sealing member 113 and the diameter of fill aperture 129 can be greater or less than 0.25 mm in exemplary embodiments.

Sealing member 113 is also sized and shaped to receive an electrode that is utilized weld the sealing member to endcap 122 and to axially align the sealing member with the electrode. In exemplary embodiments, as shown in FIG. 2, sealing member 113 may protrude above outer surface 127. It should of course be noted that the configuration or cross-sectional shape of fill aperture 129 can be varied depending upon the desired sealing characteristics of enclosure 112. For example, in an alternative exemplary embodiment, fill aperture 129 could be conically shaped or be formed with one or more stepped-portions, which could be utilized, for example, so that sealing member 113 does not protrude above an outer surface 127 of endcap 122. In exemplary embodiments, the size and shape of sealing member 113 can be varied based upon the desired sealing characteristics and on the size and shape of fill aperture 129.

Figure 5:
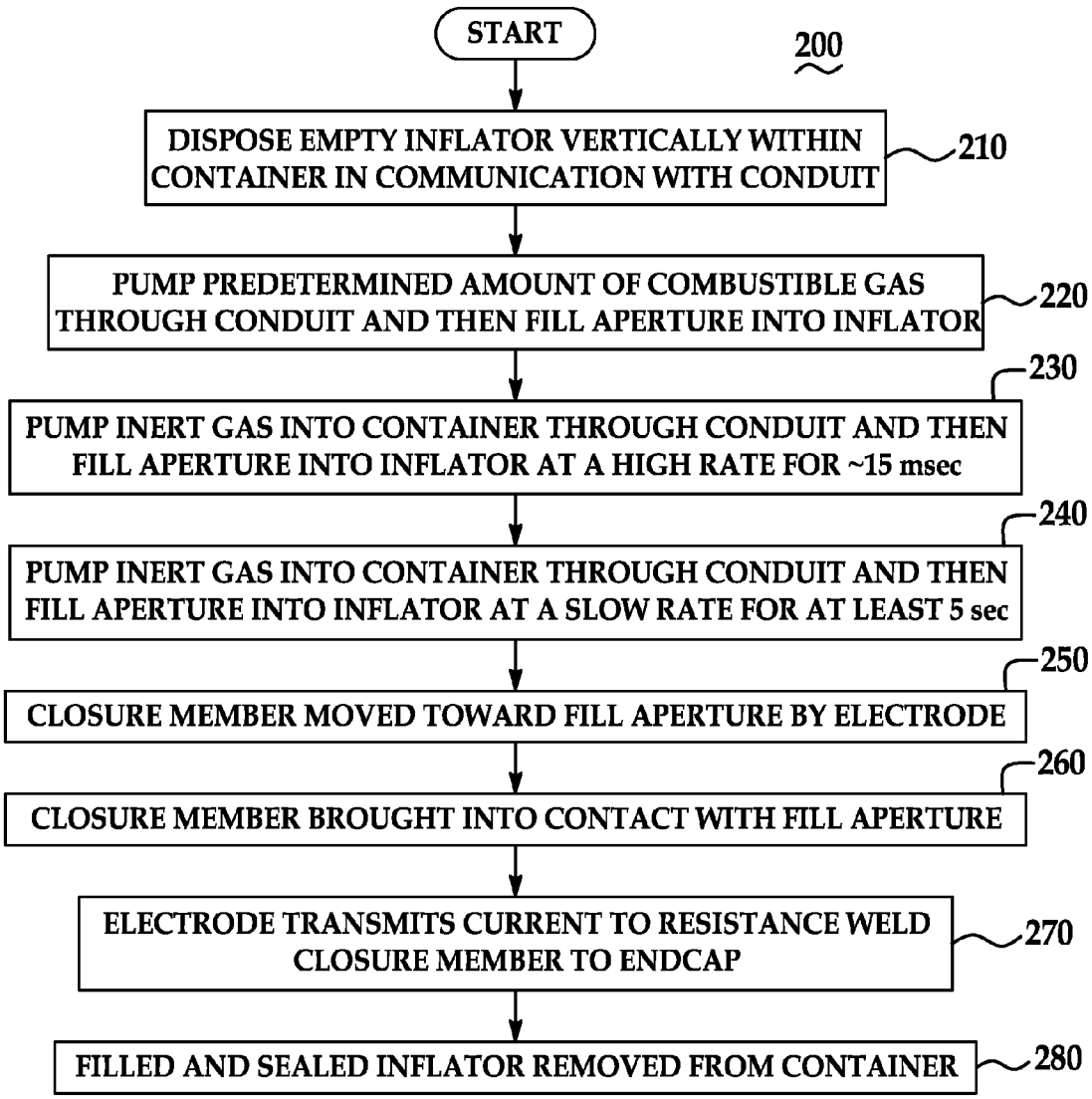
FIG. 5 is a flowchart of a method for filling and sealing an inflator with an ignitable mixture of gas in accordance with an exemplary embodiment of the present invention.

Referring now to FIG. 5, a flow diagram illustrating a process 200 for filling interior chamber 115 of empty inflator 118 with a combustible gas and an inert gas or an inert gas mixture and thereafter sealing the gas within the inflator in accordance with an exemplary embodiment of the present invention is provided. It should of course be noted that the following steps are exemplary and not intended to be limiting. Process 200 can be performed to fill interior chamber 115 of inflator 118 with a combustible gas and an inert gas or an inert gas mixture and thereafter seal the gases within the inflator by, for example, the exemplary system 310 described below with reference to FIGS. 6a and 6b. As such, the exemplary steps of process 200 will now be described with reference to the components of system 310, which will be described in greater detail below. It should of course be noted that the use of system 310 in performing the following steps is exemplary and not intended to be limiting.

Exemplary process 200 begins at step 210, at which empty inflator 118 is vertically disposed such that second end 121 of enclosure 112 is located below first end 119 within an interior volume of an container 311 configured to receive and supportively retain the inflator therein. Container 311 is also configured to receive a combustible gas (for example, hydrogen or a hydrogen-hydrocarbon mixture) and an inert gas or premixed inert gas mixture (for example, oxygen, helium, and/or argon) from a pressurized gas source 314 through an airtight conduit 315 disposed between the pressurized gas source and the inflator. The gases are routed through the conduit into the interior of the container, where they are further routed through the conduit to enter the inflator through fill aperture 129 at the second end of the enclosure to fill interior chamber 115 of the inflator with the gases.

At step 220, the pressurized gas source pumps a pressurized combustible gas through conduit into the container to urge the combustible gas through the fill aperture formed through endcap 122 of the inflator until a predetermined amount of the combustible gas has been added to the interior chamber of the inflator. Thus, the combustible gas passes through the interior volume of the container within the airtight conduit and thereafter through the fill aperture into the interior chamber of the inflator. In exemplary embodiments, to accurately supply the predetermined amount of combustible gas to the inflator, the combustible gas within the inflator can be measured to be within a pressure tolerance (or, alternatively, within a weight tolerance) that is specified according to the particular configuration of the inflator. For instance, in non-limiting examples, the combustible gas can be measured to be within a pressure tolerance of approximately ±3 psi of a specified pressure or within a weight tolerance of approximately ±0.0029 grams of a specified weight.

In exemplary embodiments, the process for adding the combustible gas to the inflator can be performed at as high a rate as possible. The predetermined amount of combustible gas is added to the inflator, and after the combustible gas added to the inflator has stabilized, the pressure or the mass of the stored combustible gas is determined. If the increased pressure or additional mass of the combustible gas is outside of the specified tolerance, the amount of combustible gas in the enclosure is adjusted.

Once the pressure within the inflator or the weight of the combustible gas added to the inflator is determined to be within a specified tolerance of the predetermined pressure or weight, then, at steps 230-240, the pressurized gas source pumps a pressurized inert gas or premixed inert gas mixture through the conduit into the container to urge inert gas through the fill aperture until a predetermined amount of inert gas has been added to the interior chamber of the inflator. In the present exemplary embodiment, the inert gas or gas mixture is added to the interior chamber of the inflator during these steps using a fill process that involves a fast-fill/slow-fill sequence. The fast-fill/slow-fill sequence utilizes the properties of the combustible gas and the inert gas or gas mixture to provide for a stratification causing a separation into thermal layers within the enclosure that includes a temporary inert layer of gas between the ignitable mixture and the weld region of endcap 122.

At step 230, the fast-fill portion of the fill sequence, during which inert gas is introduced to the enclosure at a high rate (for example, at a desired pressurization rate of greater than 200 psi/sec), is performed and results in a thoroughly mixed gas mixture that is ignitable. In general, the pressurization rate that is desired can be expected to increase as the size of the inflator increases in varying applications, although whether this correlation exists in each particular application will be determined according to the manufacturing requirements. In exemplary embodiments, the length of the time period during which the fast-fill portion is conducted to achieve the ignitable gas mixture can be determined according to the particular configuration of the inflator, the desired pressurization rate, and the final pressurization level, as well as other desired characteristics of the fill process, such as, for example, considerations of manufacturing efficiency. For instance, in non-limiting examples, the fast-fill process can last about 10-15 seconds. In general, the length of time during which the fast-fill process is conducted will be longer for larger-sized inflators and shorter for higher pressurization rates. That is, the length of time during which the fast-fill process is conducted to achieve the ignitable gas mixture will be directly correlated to the size of the inflator and inversely correlated to the pressurization rate.

At step 240, the slow-fill portion, which immediately follows the fast-fill portion and during which inert gas is introduced to the enclosure at a slower rate (for example, at a desired pressurization rate of less than 100 psi/second such as approximately 40 psi/second), allows for an accurate fill pressure reading and is performed to create a thermal gradient between the ignitable mixture that resulted from the fast-fill portion and the inert gas or gas mixture. In general, the pressurization rate that is desired can be expected to increase as the size of the inflator increases in varying applications, although whether this correlation exists in each particular application will be determined according to the manufacturing requirements. In exemplary embodiments, the length of the time period during which the slow-fill portion is conducted to create a thermal gradient between the ignitable mixture and the inert gas or gas mixture introduced during the slow-fill portion can be determined according to the particular configuration of the inflator, the desired pressurization rate, and the final pressurization level, as well as other desired characteristics of the fill process, such as, for example, considerations of manufacturing efficiency. For instance, in non-limiting examples, the slow-fill process can last about 2-10 seconds. In general, as with the fast-fill process performed at step 230, the length of time during which the slow-fill process is conducted to achieve the ignitable gas mixture will directly correlate to the size of the inflator and inversely correlate to the pressurization rate.

In exemplary embodiments, the transition between the fast-fill portion of step 230 and the slow-fill portion of step 240 can be directed by control unit 322. In a first example, the control unit can be configured to respond to a pressure transducer that measures the pressure and sends a signal representing this measurement to the control unit. The control unit can direct the fast-fill portion to last until the signal representing the pressure within the inflator as measured by the transducer reaches a first specified pressurization level, and then immediately lower the pressurization rate and direct that the slow-fill portion last until the signal representing the pressure within the inflator as measured by the transducer reaches a second specified pressurization level. The second pressurization level is equivalent to the desired final pressurization level for the inflator. The pressure transducer can be used to achieve a final pressurization level for the inflator that is within a tolerance specified according to the particular configuration of the inflator. In one non-limiting example, the pressurization level achieved following the slow-fill process can be achieved within a tolerance of approximately ±50 psi of a specified pressurization level.

In a second example, the control unit can be pre-configured to direct that the fast-fill portion last for a first specified time period and that the slow-fill portion last for a second specified time period. In specific embodiments, the first specified time period can be predetermined according to the desired pressurization rate during the fast-fill portion of the fill process, a desired pressurization level following the fast-fill portion, and the particular configuration of the inflator, and the second specified time period can be predetermined according to the desired pressurization rate during the slow-fill portion of the fill process, a desired pressurization level following both portions of the fill process, and the particular configuration of the inflator.

By extending the time period for the slow-fill portion of the inert gas filling sequence, the inert gas or gas mixture introduced at step 240 is given a greater opportunity to expand within the interior chamber of the inflator and thereby cool in temperature. Exemplary process 200 thus operates to, as a result of the thermal gradient between the ignitable mixture that resulted from the fast-fill portion and the inert gas or gas mixture introduced during the slow-fill portion, induce stratification layers of the gases added to the enclosure in the form of a "warmer" layer of ignitable gas mixture to rise and temporarily "float" above a "colder" layer of inert gas due to the temperature variation. As a result, the extended time period for the slow-fill portion of the filling sequence builds a separate colder layer of inert gas (for example, the temperature of the inert gas layer may be about 30 degrees Celsius) proximate to the fill aperture and the closure weld area. This will cause the warmer ignitable gas mixture to rise within the inflator as a result of buoyancy, and, as a result of the temporary cold layer of inert gas, a temporary seal of the fill aperture is not required to prevent ignition of the ignitable gas mixture when sealing member 113 is welded to the endcap while the cold layer of inert gas is between the welding region and the ignitable gas mixture. In exemplary embodiments, complete diffusion the ignitable gas mixture and the cold layer of inert gas can take as long as 9 hours, during which time the welding can be performed.

Once the fast-fill/slow-fill sequence of steps 230-240 is performed to create the temporary cold layer of inert gas between the welding region and the ignitable gas mixture, and the gas fill reaches a predetermined pressure, the fill aperture can be sealed. The final amount of the gas can be determined after the fill process to confirm the process pressure measurements. In exemplary embodiments, the gas within the inflator can be measured to be within a pressure tolerance (or, alternatively, a within a weight tolerance) that is specified according to the particular configuration of the inflator. For instance, in one non-limiting example, the final amount of gas can be measured to be within a tolerance of approximately ±0.5 grams of a specified weight. At step 250, a linear actuator causes an electrode to engage the sealing member and move the sealing member in a first direction towards the fill aperture. In particular, a concave surface of the electrode engages the convex shaped outer surface 117 of the sealing member.

At step 260, the linear actuator urges the electrode to move the sealing member in the first direction into contact with the circular edge 131 formed between inner side-wall surface 125 and outer surface 127 of the electrically conductive endcap. The circular edge formed in the endcap has a diameter that is smaller than the diameter of the sealing member such that the sealing member can weldably seal the fill aperture. For example, the diameter of the sealing member can be 0.25 millimeters larger than the diameter of the fill aperture. Of course, it should be noted that the difference between the diameter of the sealing member and the diameter of the fill aperture can be greater or less than 0.25 millimeters in exemplary embodiments.

At step 270, the electrode transmits a welding current into the sealing member while the endcap is coupled to electrical ground. In particular, an electrical welding current source can route a welding current through the electrode to the sealing member. The welding current causes a resistance weld and bonds the sealing member to the endcap to create a weld joint at the location where the sealing member is contacting the endcap to create a weld seal or weld sealing region. Thus, exemplary process 200 does not require the use of a temporary a press-fit seal within the fill aperture prior to welding the sealing member to the endcap of inflator. Rather, the cold layer of inert gas formed proximate to the fill aperture and closure weld area at step 240 can operate to prevent inadvertent ignition of the ignitable gas mixture (that is, the mixture of combustible gas and inert gas formed during the fast-fill portion of the filling sequence) during the application of the weld seal that is formed by a welding process that may produce flash or sparks. Following the welding operation, the pressurized gas will be sealed within the inflator and the ignitable gas mixture will diffuse into the cold inert gas layer. At step 280, the inflator can be removed from the container.

Figure 6A:
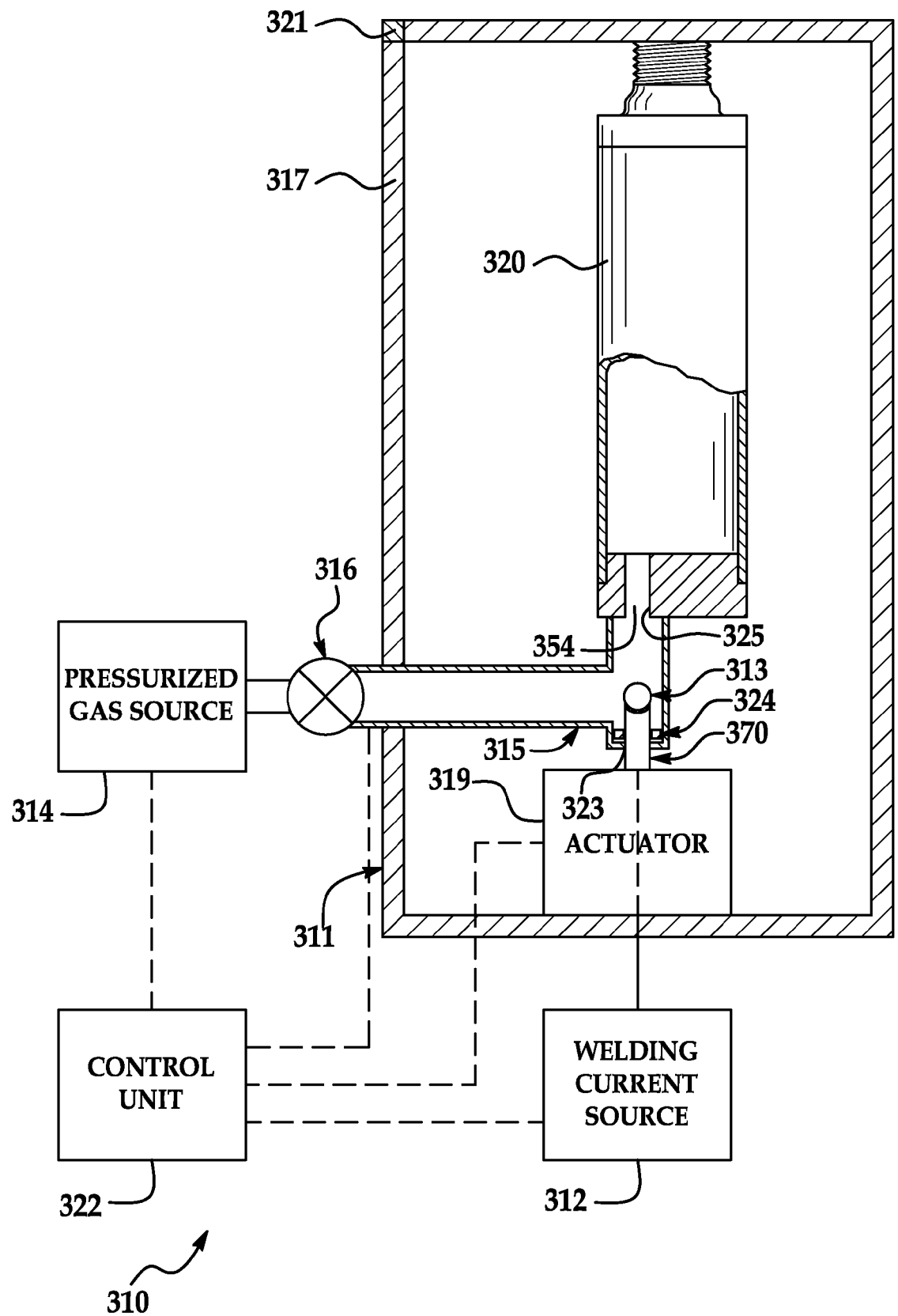
FIGS. 6a and 6b are illustrations of a system for filling and sealing an inflator with an ignitable mixture of gas in accordance with an exemplary embodiment of the present invention.
Figure 6B:
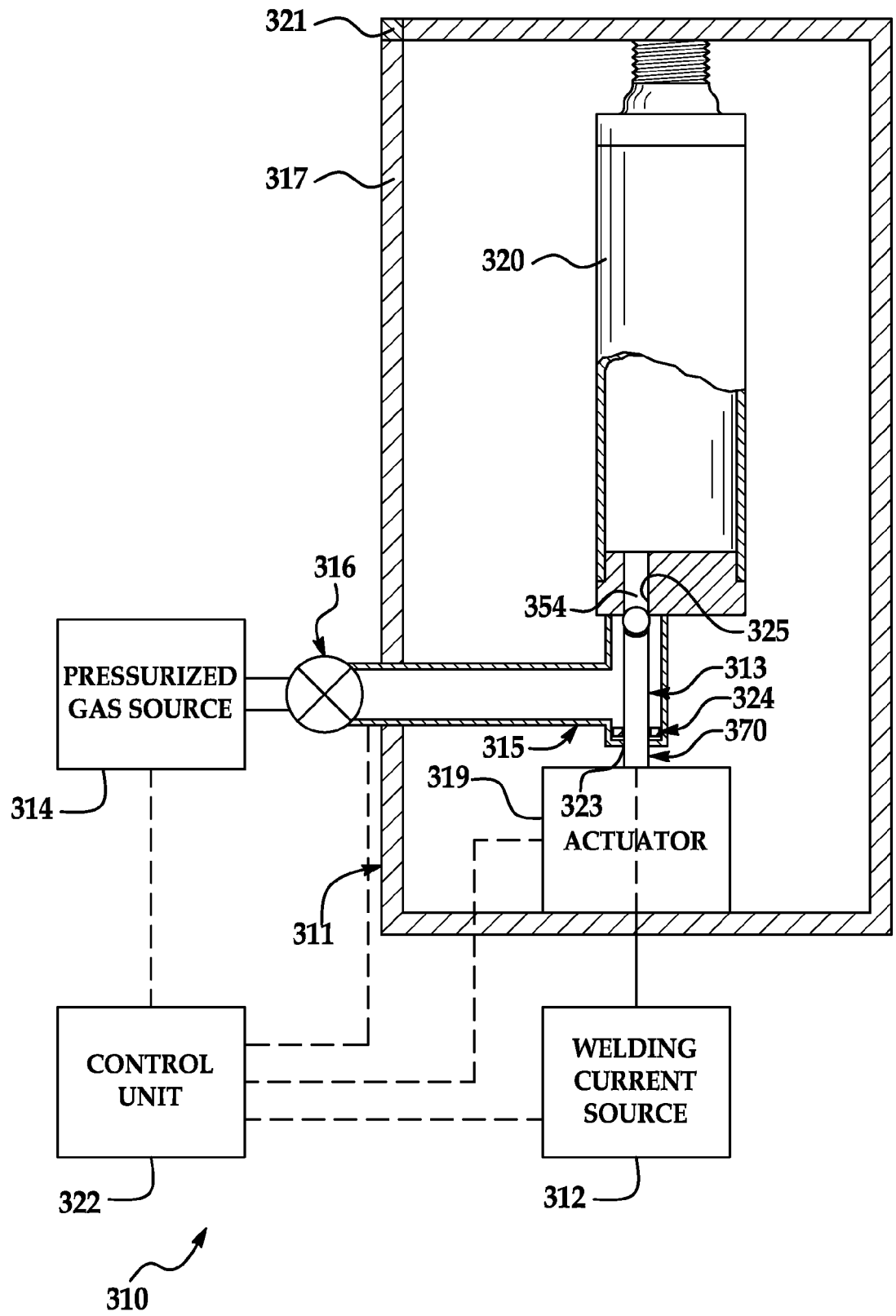

Referring now to FIGS. 6a and 6b, a system 310 for filling an interior chamber of an inflator 320 with a combustible gas and an inert gas or an inert gas mixture and thereafter sealing the gases within the inflator in accordance with an exemplary embodiment of the present invention is illustrated. As shown, system 310 includes an container 311, a welding current source 312, a linear actuator 319 operably coupled to an electrode 370, a pressurized gas source 314, a conduit 315, a valve 316, and a control unit 322.

Container 311 is provided to receive and supportively retain an inflator 320 therein. Container 311 includes a door 317 that rotates about a hinge 321 to allow door 317 to move from a closed position to an open position. Thus, a user can open door 317 to dispose inflator 320 within an interior chamber of container 311. Conduit 315 extends laterally from valve 316 into the interior chamber of container 311 to a point beyond electrode 370. Conduit 315 then forms an elbow within the interior chamber of container 311 and extends longitudinally to inflator 320 where the conduit forms an airtight connection with the exterior surface of the inflator. By way of this airtight connection, conduit 315 is in fluid communication with an interior chamber of inflator 320 through a fill aperture 354 of the inflator. Inflator 320 can thereby receive a combustible gas, such as hydrogen or a hydrogen-hydrocarbon mixture for example, and an inert gas from pressurized gas source 314 via conduit 315 disposed between valve 316 and fill aperture 354.

In exemplary embodiments, valve 316 can be a flow control valve mechanism that controls the pressurization rate of gas being delivered from pressurized gas source 314. In general, when valve 316 is in an open operational position, a combustible gas or an inert gas from pressurized gas source 314 is routed through conduit 315 into container 311. Thereafter, the gas is routed through conduit 315 and enters fill aperture 354 of inflator 320 to fill an interior of the inflator with the gas. Fill aperture 354 is of a generally cylindrical shape defined by an electrically conductive inner side-wall surface 325.

Control unit 322 is operably coupled to valve 316 and pressurized gas source 314. Control unit 322 is configured to direct operation of valve 316 and pressurized gas source 314 such that the combustible gas and the inert gas are delivered in separate stages according to steps 220-240 of exemplary process 200 illustrated in FIG. 5 to induce stratification of the gases added to inflator 320 resulting from the thermal gradient between the ignitable mixture of combustible gas and inert gas introduced during the fast-fill portion of the inert gas fill process and the inert gas introduced during the slow-fill portion.

Control unit 322 is also operably coupled to linear actuator 319 and welding current source 312. As shown, linear actuator 319 may be disposed within an interior of container 311. Control unit 322 is configured to direct linear actuator 319 to move electrode 370 in a linear direction. Electrode 370 is coupled to a sealing member 313 that is formed as a metal spherical welding ball. As illustrated in FIG. 6a, the elbow of conduit 315 includes a cavity 323 formed therein for receiving electrode 370. Byway of cavity 323, electrode 370 can extend longitudinally within conduit 315 toward fill aperture 354 of inflator.

As shown in FIG. 6b, linear actuator 313 may move electrode 370 (and sealing member 313 coupled to electrode 370) in a longitudinal direction to move sealing member 313 into sealing contact with fill aperture 354 of inflator 320. Thus, the longitudinally extending portion of conduit 315 has cross-sectional diameter that is larger than the diameter of electrode 370 (and of sealing member 313) such that the electrode and the sealing member can extend into and move within the conduit. To allow for this movement of electrode 370 within conduit 315 while preventing gas leakage through cavity 323, a gas seal 324 is disposed within the conduit adjacent to the cavity about (or partially about) the electrode. In exemplary embodiments, gas seal 324 can be made from a thermoplastic such as ultra high-molecular weight polyethylene or a flouropolymer such as Teflon to prevent gas leakage while allowing for sliding of electrode 370 therethrough as longitudinal movement of the electrode is caused by linear actuator 313. For example, gas seal 324 can comprise a Teflon seal of the type manufactured by American Variseal Corporation.

Control unit 322 is further configured to activate welding current source 312 to route a welding current through electrode 370 to sealing member 313 to resistance weld the sealing member to a wall of inflator 320 to seal fill aperture 354. Fill aperture 354 a diameter that is smaller than the diameter of sealing member 313 such that the sealing member can weldably seal the fill aperture. It should be noted that aforementioned system is but one example of a system for filling inflator 320 and other means for filling an inflator with a combustible gas and an inert gas or inert gas mixture under pressure could be utilized in other exemplary embodiments of the present invention.

In exemplary embodiments, control unit 322 may take any well-known form in the art and includes a central microprocessor or CPU in communication with the components of the system described herein via one or more interfaces, controllers, or other electrical circuit elements for controlling and managing the system.

Exemplary embodiments of the present invention can be implemented to eliminate the need for the manufacture of corresponding multi-machined sealing members and fill apertures having complex and expensive features, thereby allowing for a simpler inflator endcap design. Exemplary embodiments can also be implemented to provide a more reliable, effective, and efficient process of sealing an inflator after filling the inflator with a pressurized gas mixture.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof Therefore, it is intended that the invention not be limited to the particular embodiments disclosed as the best mode contemplated for carrying out this invention, but that the invention will include all embodiments falling within the scope of the appended claims.

What is claimed is:

1. A method for filling an enclosure with an ignitable mixture of gases, the enclosure having an outer wall comprising an exterior surface, an interior surface, and a fill aperture extending there through, the method comprising: delivering a predetermined amount of pressurized combustible gas into the enclosure through the fill aperture; delivering a first predetermined amount of pressurized inert gas into the enclosure through the fill aperture at a first pressurization rate, the first pressurization rate allowing the first predetermined amount of pressurized inert gas to mix with the predetermined amount of pressurized combustible gas to form an ignitable mixture within the enclosure, the first pressurization rate resulted a first temperature; delivering a second predetermined amount of pressurized inert gas into the enclosure through the fill aperture at a second pressurization rate, the second pressurization rate being lower than the first pressurization rate, the second pressurization rate allowing stratification to form within the enclosure between a layer of the ignitable mixture at the first temperature and a layer of the second predetermined amount of pressurized inert gas at a second temperature, wherein the second pressurization rate resulted the second temperature, and the second temperature being lower than the first temperature, wherein the stratification between the ignitable mixture and the second predetermined amount of pressurized gas is the result of a thermal gradient, the layer of the second predetermined amount of pressurized inert gas being disposed between the layer of the ignitable mixture and the fill aperture; and welding a sealing member to the outer wall of the enclosure by a welding process to form a weld operable to seal the fill aperture and to permit the enclosure to store pressurized gas therein.

2. The method of claim 1, wherein the welding process generates an amount of heat sufficient to ignite the ignitable mixture if the ignitable mixture was exposed to the welding process, and wherein the stratification operates to prevent the ignitable mixture from being exposed to the welding process.

3. The method of claim 2, wherein the welding process comprises resistance welding.

4. The method of claim 1, wherein the pressurized combustible gas comprises hydrogen, hydrocarbon, or a combination thereof.

5. The method of claim 1, wherein the first and second predetermined amounts of pressurized inert gas comprise a mixture of oxygen, helium, and argon.

6. The method of claim 1, wherein the enclosure is filled with the first predetermined amount of pressurized inert gas at the first pressurization rate for about 10 to about 15 seconds.

7. The method of claim 1, wherein the enclosure is filled with the second predetermined amount of pressurized inert gas at the second pressurization rate for about 2 to about 10 seconds.

8. The method of claim 1, wherein the first pressurization rate is greater than 200 psi/second.

9. The method of claim 1, wherein the second pressurization rate is less than 100 psi/second.

10. The method of claim 1, wherein the fill aperture is defined by a generally cylindrical inner side-wall extending through the enclosure between the exterior surface and an interior surface, and wherein the sealing member is a metal spherical welding ball having a diameter that is greater than a diameter of the fill aperture.

11. The method of claim 10, wherein the weld is formed at a welding region between an outer surface of the welding ball and a generally circular edge formed between the inner side-wall and the exterior surface of the enclosure.

12. The method of claim 11, wherein the outer surface of the welding ball protrudes beyond the exterior surface of the enclosure after the weld is formed.

13. The method of claim 1, further comprising disposing the enclosure in a vertical position such that a first end of the enclosure proximate the fill aperture is disposed below a second end of the enclosure, the first end opposing the second end.

14. The method of claim 1, wherein the enclosure comprises a heated gas inflator for an air bag module.

* * * * *